May 8, 1956  E. H. B. BARTELINK  2,745,097

RADIO ECHO DETECTION SYSTEM

Filed Oct. 30, 1945

INVENTOR
EVERHARD H. B. BARTELINK

BY

ATTORNEY

United States Patent Office 2,745,097
Patented May 8, 1956

2,745,097
RADIO ECHO DETECTION SYSTEM

Everhard H. B. Bartelink, Cambridge, Mass., assignor, by mesne assignments, to the United States of America as represented by the Secretary of the Navy Application October 30, 1945, Serial No. 625,665

7 Claims. (Cl. 343—11)

This invention relates to object detectors, particularly those which emit a directed series of electromagnetic pulses and utilize the reflected energy from the object on which the pulses impinge to furnish an indication of the direction and range of the object.

Object detectors are already well known in the art and have been developed sufficiently to permit their use in gun laying where extreme accuracy is required. The present object detectors as used in gun laying use either conical scanning or multiple lobing. A conical scan system presents the mechanical difficulty of securing a sufficiently rapid scan to avoid losing a rapidly moving or fluctuating signal, such as from an aircraft. A multiple lobing system presents difficulty in balancing the overall gain of any two of the necessary plurality of receiver channels, particularly when the receiver gains are to be varied over wide ranges.

In the present invention a multiple lobing system is used, but a receiver is used having only one channel. A unique switching means is provided for alternately connecting the receiver channel to the respective lobe paths in the antenna during reception of the reflected transmitter pulse to permit comparison of the energy received by the respective lobe paths. This will furnish an indication of the correction necessary in the direction of the antenna to permit training on the target. To secure sufficient switching during a transmitter pulse, a relatively wide transmitter pulse is necessary with a resulting loss of range accuracy. This objection is overcome by alternating the wide pulse with a narrow pulse which is used only for determination of range.

It is an object of this invention to provide an object detector, which indicates accurately the direction and range of a fast moving object.

It is a further object of this invention to provide an object detector using multiple lobing with a single receiver channel.

It is a further object of this invention to provide an object detector for use in the laying of guns or similar directive devices.

These and other objects will become more apparent upon consideration of the following description together with the accompanying drawing where:

Figure 1:
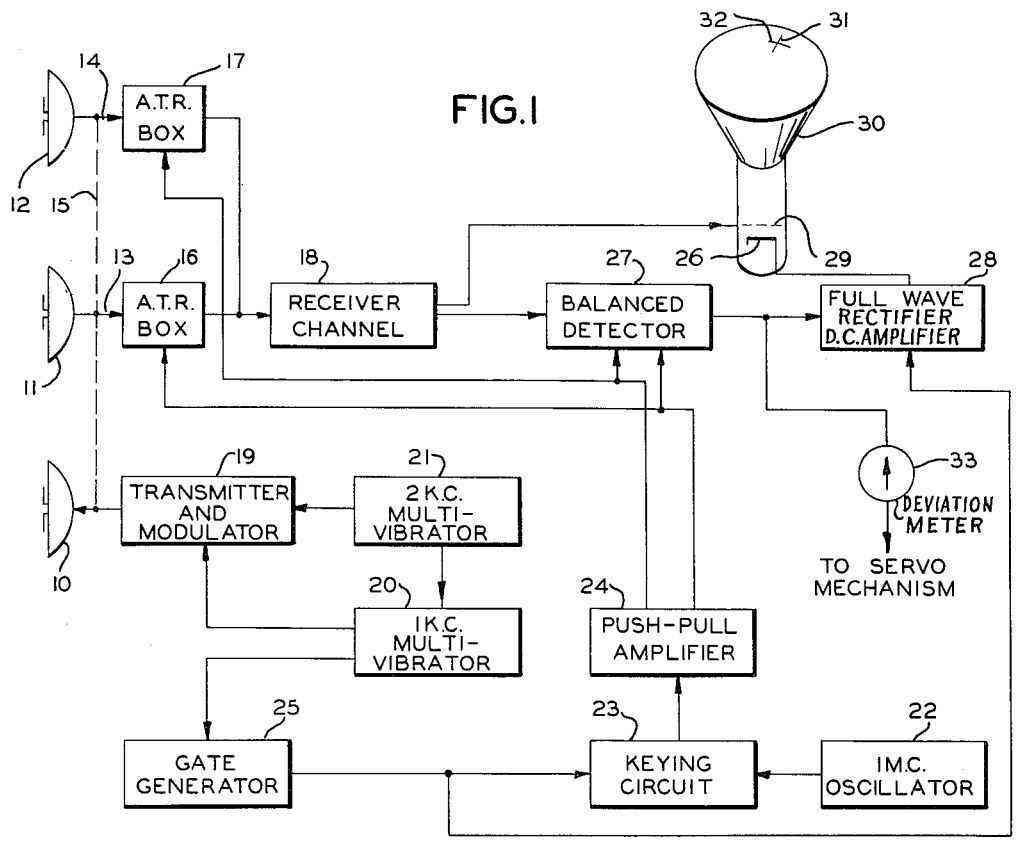
Fig. 1 is generally a block diagram of an embodiment of the invention.

The embodiment of the invention disclosed in Fig. 1 includes an antenna array which comprises a transmitting parabolic reflector type antenna 10 in which the radio frequency energy is fed to a dipole located at the focal point of the parabola and two similar receiving dipoles with parabolic reflectors 11 and 12, all mechanically linked to move together as indicated by dotted line 15 in either azimuth or elevation or both to permit simultaneous motion in the direction of an object to be detected. Dipole parabolic reflector antennas are called hereinafter by the name "dish" by which they are commonly called. The receiving dishes have overlapping lobe patterns which enable the dishes 11 and 12 to impress equal amounts of energy on the receiving paths 13 and 14 corresponding to the respective lobes when the antenna is directed on the object, and different amounts when the antenna is directed off the object. Electronic antenna switches, known as anti-transmit receive (ATR) boxes, 16 and 17 are placed in respective paths 13 and 14 for alternately disconnecting the respective paths to a receiver channel 18 in response to triggering voltage applied thereto.

Figure 2:
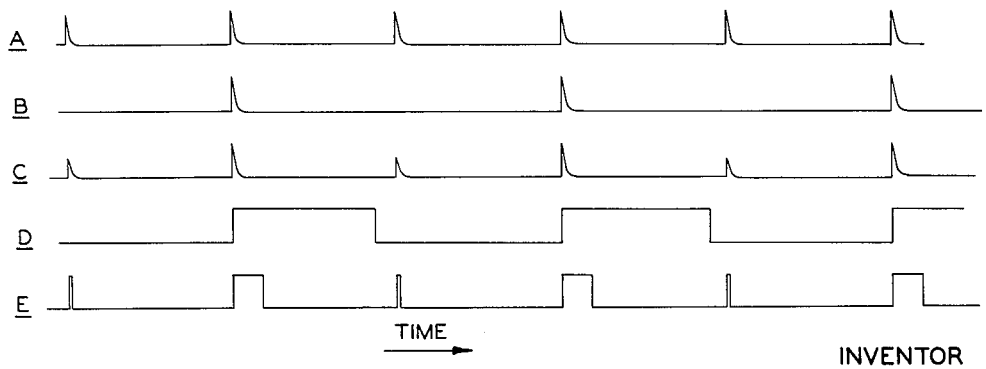
Fig. 2 is a diagram of certain waveforms which occur in this embodiment.

Block 19 represents a transmitter and associated modulator, which impresses either a long or short pulse of electromagnetic energy on the antenna, which is directed by dish 10 in the desired direction of emission. Multivibrators 20 and 21 are locked through the path joining their blocks to produce each a series of pips of a frequency of 1 and 2 kilocycles respectively, alternating pips of the higher frequency series coinciding in time with succeeding pips of the lower frequency series as shown by waveforms A and B in Fig. 2. Both series of pips are impressed on the modulator at 19 and combined therein to result in alternating large and small pips as shown by waveform C, a large pip occurring when pips of each series are coincident. The modulator is designed to trigger the transmitter in such a manner that it generates a relatively long pulse emission, say 10 microseconds, in response to the large pip and a relatively short pulse emission, say 1 microsecond, in response to the small pip. Thus a series of alternating long and short pulse emissions as shown by waveform E will be directed from the antenna in the desired direction of emission. Alternatively, the modulator may be arranged to produce short pulse emissions when A pips occur alone and long pulse emissions when A and B pips occur simultaneously.

An oscillator 22 having a period relatively short in relation to the duration of the long pulse emission is provided. With a 10 microsecond long emission pulse a frequency in the order of 1 megacycle for the oscillator is necessary. The output of the oscillator is fed through a keying circuit 23 to a push-pull amplifier 24, which gives a balanced amplified output having also a frequency of one megacycle. The pips from multivibrator 20 are utilized to trigger a gate generator 25 to produce a voltage gate as shown by waveform D in Fig. 2. The voltage gate has a duration almost that of the period of the higher frequency multivibrator, which in the instant embodiment will be a few microseconds less than 500. The gate voltage controls keying circuit 23 to connect the output of oscillator 22 to amplifier 24 during occurrence of the voltage gate. One of the balanced outputs of amplifier 24 is led to each of the ATR boxes 16 and 17. When an ATR box is triggered by a positive voltage from amplifier 24 the corresponding antenna path 13 or 14 will be effectively disconnected. Thus receiving paths will be alternately disconnected at half microsecond intervals during the occurrence of the gate voltage from generator 25, which will also be the time that any reflected pulses of the long emission pulse are received. During reception of the long reflected pulse the output of receiver channel 18 will be a series of adjacent pulses of half microsecond duration, the relative heights of adjacent pulses corresponding to the amount of reflected energy received by each of the paths 13 and 14, which in turn depends on the direction of the reflecting object with respect to the antenna. The receiver channel output is fed to a balanced detector 27, already well known in the art, while the balanced output from amplifier 24 is also fed to this detector. Consequently at the output of balanced detector 27, a voltage wave will appear proportional to the difference in magnitudes of the adjacent half microsecond pulses in the receiver channel output, and of polarity depending on the direction of deviation of the direction of the antenna from that of the object. This voltage wave is rectified and amplified in a full wave rectifier and amplifier 28 to produce a direct voltage whenever a difference exists between adjacent half microsecond pulses. This direct voltage is impressed on cathode 26 of a cathode ray tube 30 in such polarity as to bias the tube beyond cut-off when any appreciable direct voltage exists. The long reflected pulse from the receiver channel is also impressed on intensifier grid 29 of cathode ray tube 30. It is to be understood that the cathode ray tube has the usual sweep and direction alignment circuits, which are not disclosed. When the antenna is directed on the reflecting object, this long reflected pulse will be indicated by a trace 31 in the form of a radial line on the tube screen. The length of the trace will depend on the duration of the sweep with reference to the duration of the pulse, and the radial direction will depend on the direction of the antenna. When the antenna is directed off the reflecting object, cathode ray tube 30 will be cutoff to render it inoperative and the trace will not appear. It is true that for extreme deviations in the antenna from the direction of the target, trace 31 would not appear with conventional circuits. However, cathode ray tube is cutoff by the circuit described above when only slight deviations occur. Hence greater accuracy in determination of the direction of the target is obtained by this circuit. Without the circuit, trace 31 would have a width comparable to the usual width of trace 32, which is the short reflected pulse displayed on the tube screen.

Since intensifier grid 29 is connected with receiver channel 18 at all times, the short reflected pulse will be impressed on the intensifier grid of the scope also. The voltage gate from generator 25 is fed to full wave amplifier rectifier 28 to unblank it and thus render it operative only for the duration of the gate. Hence any disturbance that amplifier rectifier 28 would otherwise produce on cathode ray tube 30 during reception of the short reflected pulses is blanked out, and the object detector functions during this reception in conventional manner to present the trace of the short pulse in a position corresponding to the range and direction of the reflecting object. The repetition rate for the short pulses is still sufficiently high for excellent operation. It is well established that a short transmitter pulse gives greater range accuracy than a long pulse. Inasmuch as a short transmitter pulse is utilized here in conventional manner for range determination, the range accuracy of this invention will be equal to that of the object detectors of the prior art. However, the direction of the object will be determined with much greater accuracy. If desired the output of balanced detector 27 may be connected to a deviation meter 33, which will indicate when the antenna is trained on and off the object being detected. Also this output may be utilized to control a servo-mechanism to train guns in accordance with the voltage fed to the servo-mechanism in a manner well known in the art.

It is to be understood that while only two receiving dishes have been disclosed to permit lobing in only one plane which may be either azimuth or elevation, two additional dishes may be provided also having overlapping lobes but lobing in a plane at right angles to the original lobing plane. This addition will obviously involve a second indicator and suitable switching circuits to utilize the received reflected pulses to furnish directions in both azimuth and elevation. It is also to be understood that in place of the plurality of dishes disclosed, a single reflector having dipoles arranged with respect thereto to give the desired lobing without undesirable coupling in manner well known in the art could be used.

The invention is to be limited only by the scope of the appended claims.

What is claimed is:

1. An object detector of the type which transmits periodically recurring radio pulses and receives pulses which are reflections from said objects, comprising a directive antenna having overlapping receiving lobes, a transmitter, means for pulsing said transmitter to produce a series of long and short pulse emissions at different times, a receiver, means for alternately disconnecting said receiving paths of said antenna from said receiver during the reception of the reflection pulses produced by said long pulse, means for producing a voltage having a magnitude depending on the difference in the energy in said reflection pulses in each of said receiving paths, a cathode ray tube connected with said receiver for indicating said reflection pulses produced by said long and short pulses, and means for biasing said cathode ray tube beyond cutoff in response to said voltage.

2. An object detector, comprising a directive antenna having overlapping receiving lobes, a transmitter, means for pulsing the transmitter to produce a series of alternating long and short pulse emissions from said antenna, a receiver, means for alternately disconnecting the receiving paths of said antenna corresponding to said lobes from said receiver for periods relatively short with respect to the duration of the long pulse at time intervals extending from the emission of the long pulse to almost the emission of the succeeding short pulse, means connected with said receiver output for producing a voltage depending on the relative magnitudes of the reflected energy received in said paths from said long pulse emissions, a cathode ray tube also connected with said receiver output for indicating the reception of reflection pulses produced by said long and short pulses, and means for biasing said cathode ray tube beyond cutoff in response to said voltage.

3. An object detector, comprising a directive antenna having overlapping receiving lobes, a transmitter connected therewith, means for producing two series of voltage peaks, one series being of a frequency twice that of the other, alternate voltage peaks of said one series coinciding in time with succeeding voltage peaks of said other series, said two series of voltage pulses combining to produce alternating large and small voltage pulse, means for triggering said transmitter in response to said large and small voltage pulses to produce a series of alternating long and short pulse emissions from said antenna, a gating circuit for producing a voltage gate in response to the occurrence of voltage pulses of the lower frequency, said voltage gate having a duration almost that of the period of the voltage pulses of the higher frequency, an oscillator having a period relatively short in relation to the duration of the long pulse emission, a push-pull amplifier for the amplifying of the output of said oscillator, a keying circuit connecting the output of said oscillator to said amplifier during said voltage gate, a receiver channel, means for alternately disconnecting the receiving paths of said antenna corresponding to each of said receiving lobes from said receiver channel in response to positive cycles of said oscillator output, a cathode ray tube connected with the output of said receiver channel for presenting the reflected energy of said short pulse emissions in a position corresponding to the range and direction of the reflecting object, a balanced detector fed by the outputs of said push-pull amplifier and said receiver channel to produce a voltage wave depending on the difference in the magnitudes of the reflected energy received by the paths in said antenna corresponding to each of said lobes, means for rectifying the said detector voltage wave and operative in response to said gate voltage to produce a voltage during said gate depending on the magnitude of said balanced detector voltage wave, means for impressing said rectifier voltage on the cathode of said cathode ray tube to bias said tube beyond cutoff in response to the deviation of the antenna from the direction of the reflecting object.

4. In a radio pulse echo object detection system of the type which transmits periodically recurring pulses of radio frequency energy in a series of alternately long and short time duration emissions and receives pulses which are reflected from objects, in combination, a directive antenna array having at least first and second dipole-fed parabolic reflector antennas mounted to have overlapping lobe patterns in a selected plane such that said antennas receive equal amounts of reflected energy from an object lying on the intersection of said lobes, a receiver, means including electronic switches for coupling each of said antennas to said receiver, a radio frequency oscillator, means energized in synchronism with the transmission of each long time duration pulse to apply the output of said oscillator to said switches so that the receiver alternately carries signals from said first and second antennas separately during alternate switching cycles, a balanced detector responsive to said oscillator output and said receiver output signal to derive an output voltage having an amplitude related to the difference in energy received by said first and second antennas and a polarity indicative of the antenna receiving the greater amount of reflected energy, a cathode ray indicator connected to said receiver for displaying the output thereof, means for rectifying and amplifying said output signal, and means for applying said rectified and amplified output voltage to bias said cathode ray tube to cut-off, whereby said cathode ray tube is inoperative in the event said antenna array directive pattern deviates from the direction to said reflecting object and means energized in synchronism with the transmission of each short time duration pulse to bias said amplifier to nonconduction, whereby said cathode ray tube indicator is operative during the reception of reflected pulses of short time duration.

5. In a radio pulse echo object detection system of the type which transmits periodically recurring pulses of radio frequency energy in a series of alternately long and short time duration emissions and receives pulses which are reflected from objects, in combination, a directive antenna array having at least first and second dispole-fed parabolic reflector antennas mounted for joint motion and arranged to have overlapping lobe patterns in a selected plane such that said antennas receive equal amounts of reflected energy from an object lying on the intersection of said lobes, a receiver, a transmission line including an electronic switch for each of said antennas for coupling said antennas to said receiver, a radio frequency oscillator, means energized in synchronism with the transmission of each long time duration pulse to apply the output of said oscillator to said electronic switches so that the receiver alternately carries signals from said first and second antennas separately during alternate switching cycles, a balanced detector responsive to said oscillator output and said receiver output signal to derive an output voltage having an amplitude related to the difference in energy received by said first and second antennas and a polarity indicative of the antenna receiving the greater amount of reflected energy and an indicator responsive to said output voltage to show the deviation and direction of deviation of said antenna array from said object.

6. In a radio pulse echo object detection system of the type which transmits periodically recurring pulses of radio frequency energy in a series of alternately long and short time duration emissions and receives pulses which are reflected from objects, in combination, a directive antenna array having at least first and second dipole-fed parabolic reflector antennas mounted for joint motion and arranged to have overlapping lobe patterns in a selected plane such that said antennas receive equal amounts of reflected energy from an object lying on the intersection of said lobes, a receiver, a transmission line including an electronic switch for each of said antennas for coupling said antennas to said receiver, a radio frequency oscillator, means energized in synchronism with the transmission of each long time duration pulse to apply the output of said oscillator to said switches so that the receiver alternately carries signals from said first and second antennas separately during alternate switching cycles, a balanced detector responsive to said oscillator output and said receiver output signal to derive an output voltage having an amplitude related to the difference in energy received by said first and second antennas and a polarity indicative of the antenna receiving the greater amount of reflected energy, an indicator responsive to said output voltage to show the deviation and direction of deviation of said antenna array from said object, a cathode ray indicator connected to said receiver for displaying the output thereof, a rectifier for said output signal, an amplifier for said rectified output signal, and means for applying said rectified and amplified output voltage to bias said cathode ray tube to cut-off, whereby said cathode ray tube is inoperative in the event said antenna array directive pattern deviates from the direction to said reflecting object.

7. In a radio pulse echo object detection system of the type which transmits periodically recurring pulses of radio frequency energy in a series of alternately long and short time duration emissions and receives pulses which are reflected from objects, in combination, a directive antenna array having at least first and second dipole-fed parabolic reflector antennas mounted for joint motion and arranged to have overlapping lobe patterns in a selected plane such that said antennas receive equal amounts of reflected energy from an object lying on the intersection of said lobes, a receiver, a transmission line including an electronic switch for each of said antennas for coupling said antennas to said receiver, a radio frequency oscillator, means energized in synchronism with the transmission of each long time duration pulse to apply the output of said oscillator to said switches so that the receiver alternately carries signals from said first and second antennas separately during alternate switching cycles, a balanced detector responsive to said oscillator output and said receiver output signal to derive an output voltage having an amplitude related to the difference in energy received by said first and second antennas and a polarity indicative of the antenna receiving the greater amount of reflected energy, an indicator responsive to said output voltage to show the deviation and direction of deviation of said antenna array from said object, a cathode ray indicator connected to said receiver for displaying the output thereof, a rectifier for said output signal, an amplifier for said rectified output signal, means for applying said rectified and amplified output voltage to bias said cathode ray tube to cut-off whereby said cathode ray tube is inoperative in the event said antenna array directive pattern deviates from the direction to said reflecting object, and means energized in synchronism with the transmission of each short time duration pulse to bias said amplifier to nonconduction, whereby said cathode ray tube indicator is operative during the reception of reflected pulses of short time duration.

References Cited in the file of this patent
UNITED STATES PATENTS

| Number | Name | Date |
|---|---|---|
| 2,143,035 | Smith | Jan. 10, 1939 |
| 2,189,549 | Hershberger | Feb. 6, 1940 |
| 2,403,527 | Hershberger | July 9, 1946 |
| 2,408,415 | Donaldson | Oct. 1, 1946 |
| 2,412,703 | Wolff | Dec. 17, 1946 |
| 2,423,024 | Hershberger | June 24, 1947 |
| 2,423,082 | Busignies | July 1, 1947 |
| 2,430,292 | Hershberger | Nov. 4, 1947 |
| 2,446,850 | Root | Aug. 10, 1948 |
| 2,480,829 | Barrow et al. | Sept. 6, 1949 |
| 2,498,495 | Jensen | Feb. 21, 1950 |
| 2,509,207 | Busignies | May 30, 1950 |